Nov. 25, 1941.　　　J. E. KING ET AL　　　2,263,971
STEREOSCOPIC PLOTTER
Filed June 17, 1941　　　5 Sheets-Sheet 1

INVENTORS
JASPER E. KING
JOHN W. ELLIOTT
PHILIP B. KAIL
BY
ATTORNEYS

Nov. 25, 1941.    J. E. KING ET AL    2,263,971
STEREOSCOPIC PLOTTER
Filed June 17, 1941    5 Sheets-Sheet 5
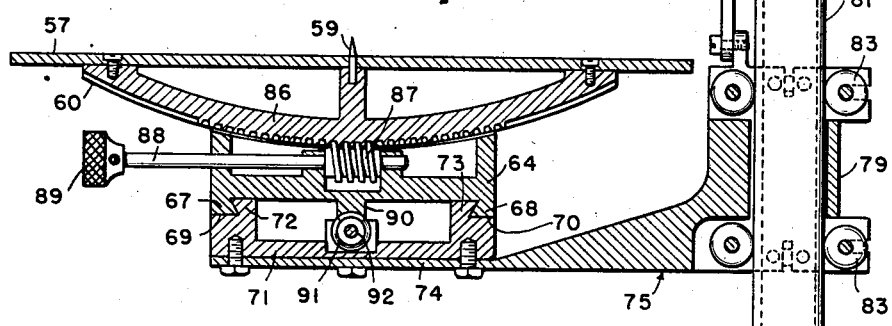
*Fig. 5.*
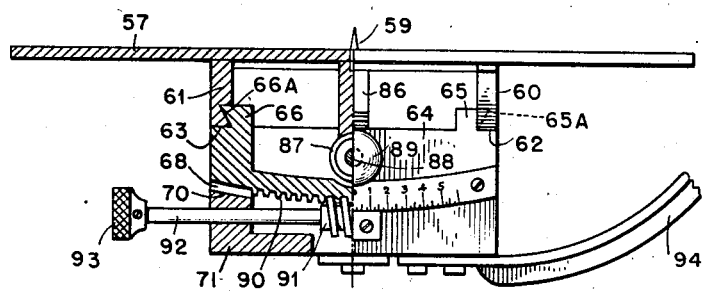
*Fig. 6.*
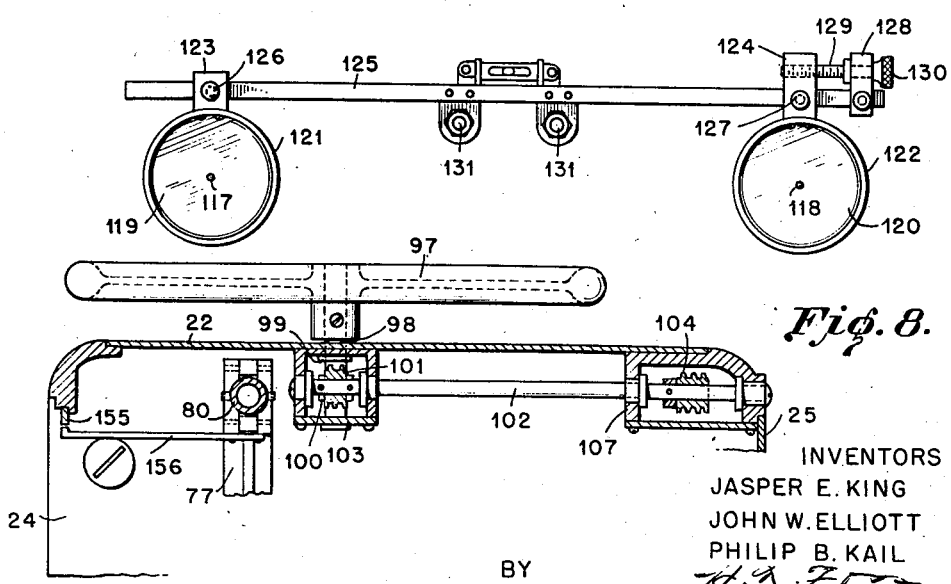
*Fig. 7.*
*Fig. 8.*
INVENTORS
JASPER E. KING
JOHN W. ELLIOTT
PHILIP B. KAIL
BY
ATTORNEYS Patented Nov. 25, 1941

2,263,971

UNITED STATES PATENT OFFICE 2,263,971

STEREOSCOPIC PLOTTER

Jasper E. King, John W. Elliott, and Philip B. Kail, Denver, Colo., assignors to Claude R. Wickard, as Secretary of Agriculture of the United States of America, and his successors in office Application June 17, 1941, Serial No. 398,442

13 Claims. (Cl. 33—20)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to photogrammetry generally and the principal object is the provision of an instrument in which vertical photographs can be viewed stereoscopically and maps fabricated giving the topography and planimetry of the model viewed. Such instruments are generally referred to as stereoscopic plotters.

The general object of this invention is the provision of an instrument of the type mentioned which is simple and inexpensive in construction as compared to instruments of a similar nature for accomplishing a similar objective.

Another object of this invention is the provision of an instrument which will permit the fabrication of maps of the type mentioned directly from the instrument on any plane surface without intermediate transference of any kind.

A further object of this invention is the provision of an instrument of the type mentioned which is portable and which can be placed over any plane surface for mapping.

The following description, considered together with the accompanying drawings, will more fully disclose this invention and further objects and advantages thereof will be apparent.

In the drawings:

Figure 5 is a section along the line 5—5 of Figure 4.

Figure 6 is a section along the line 6—6 of Figure 4.

Figure 7 is a plan view of the index marks and supporting bar.

Figure 8 is a section along the line 8—8 of Figure 2.

Figure 1:
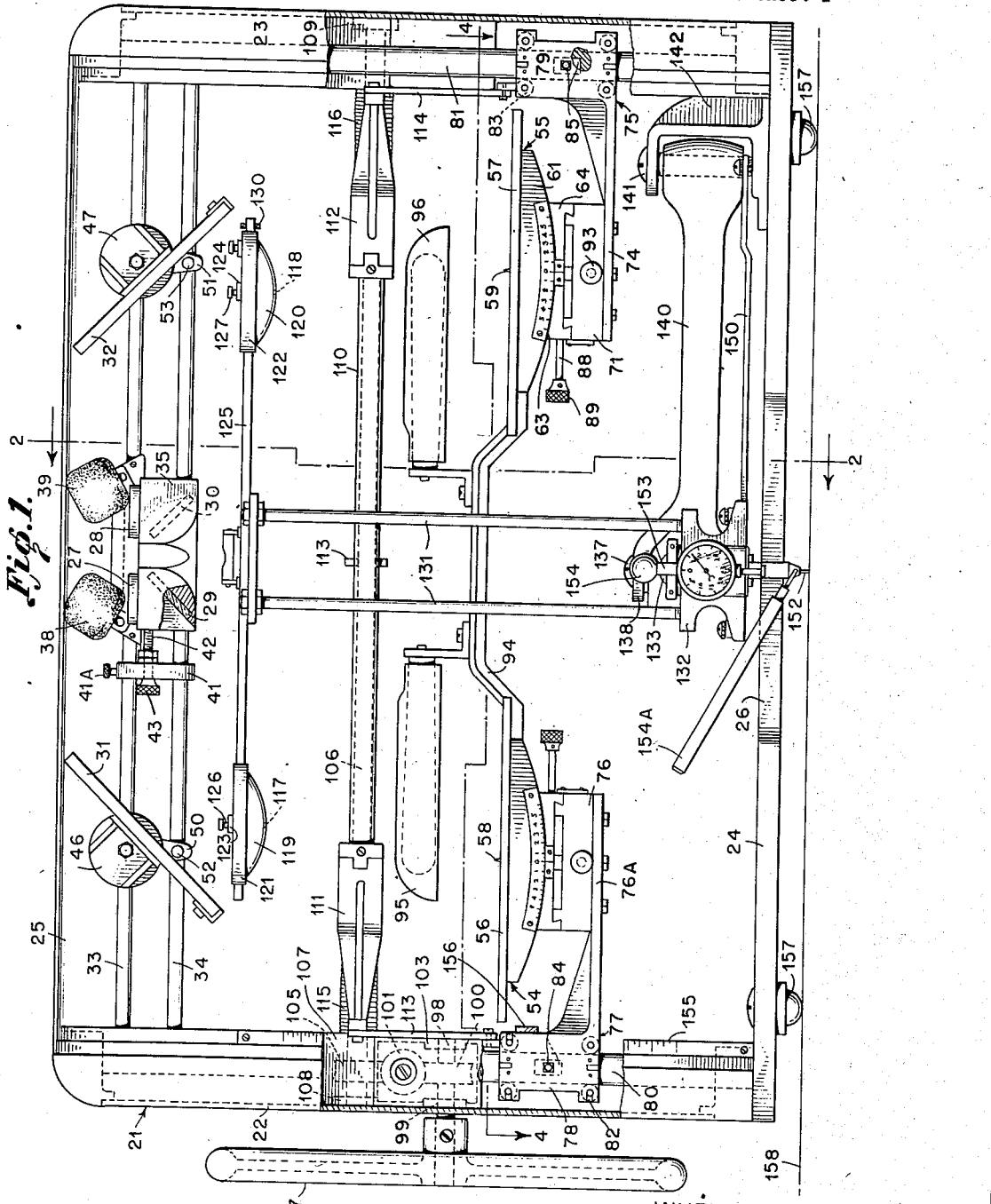
Figure 1 is a front elevational view illustrating the general arrangement of parts of an embodiment of our invention, partly broken away.
Figure 2:
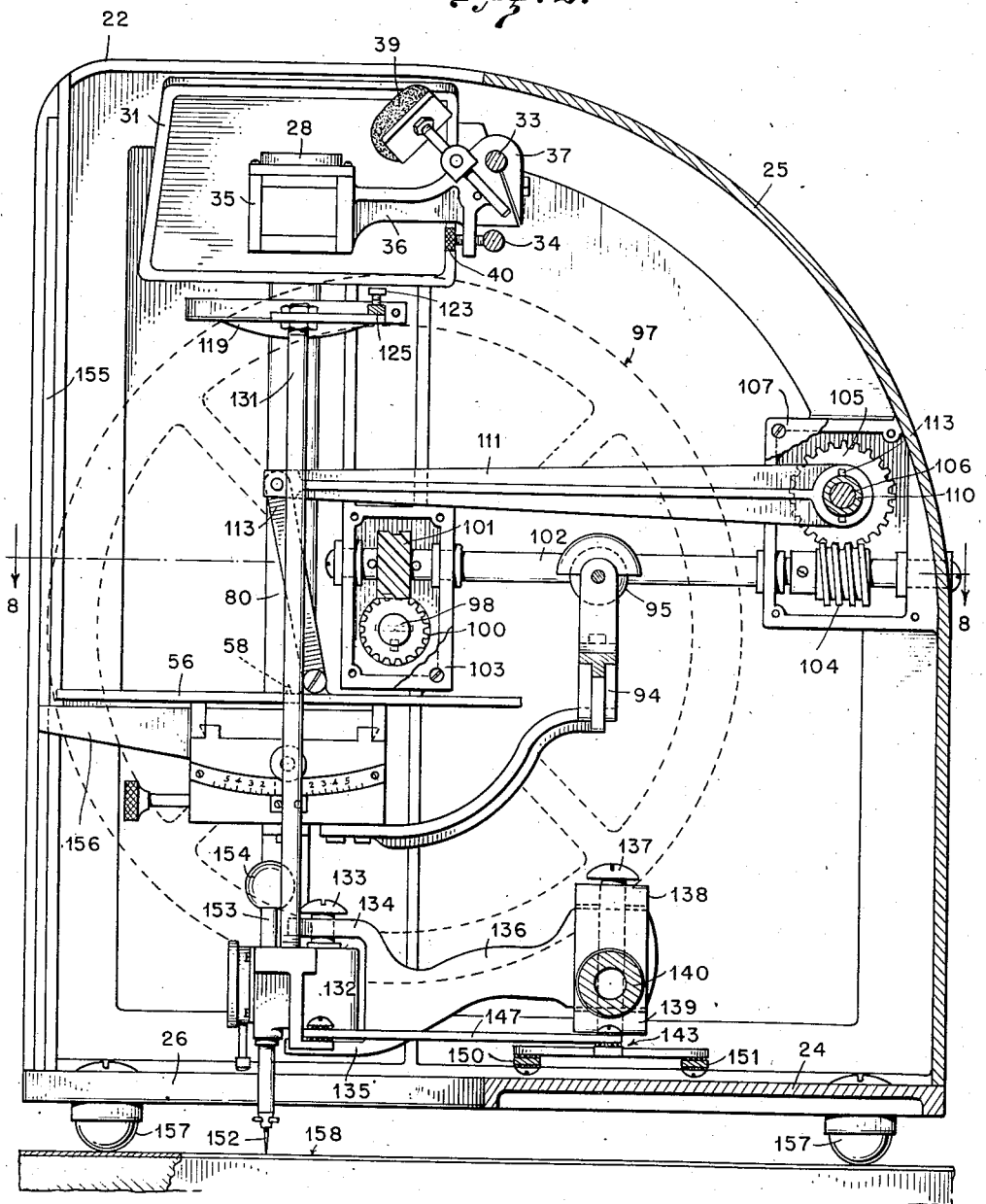
Figure 2 is a section along the line 2—2 of Figure 1 with parts in the background broken away.
Figure 3:
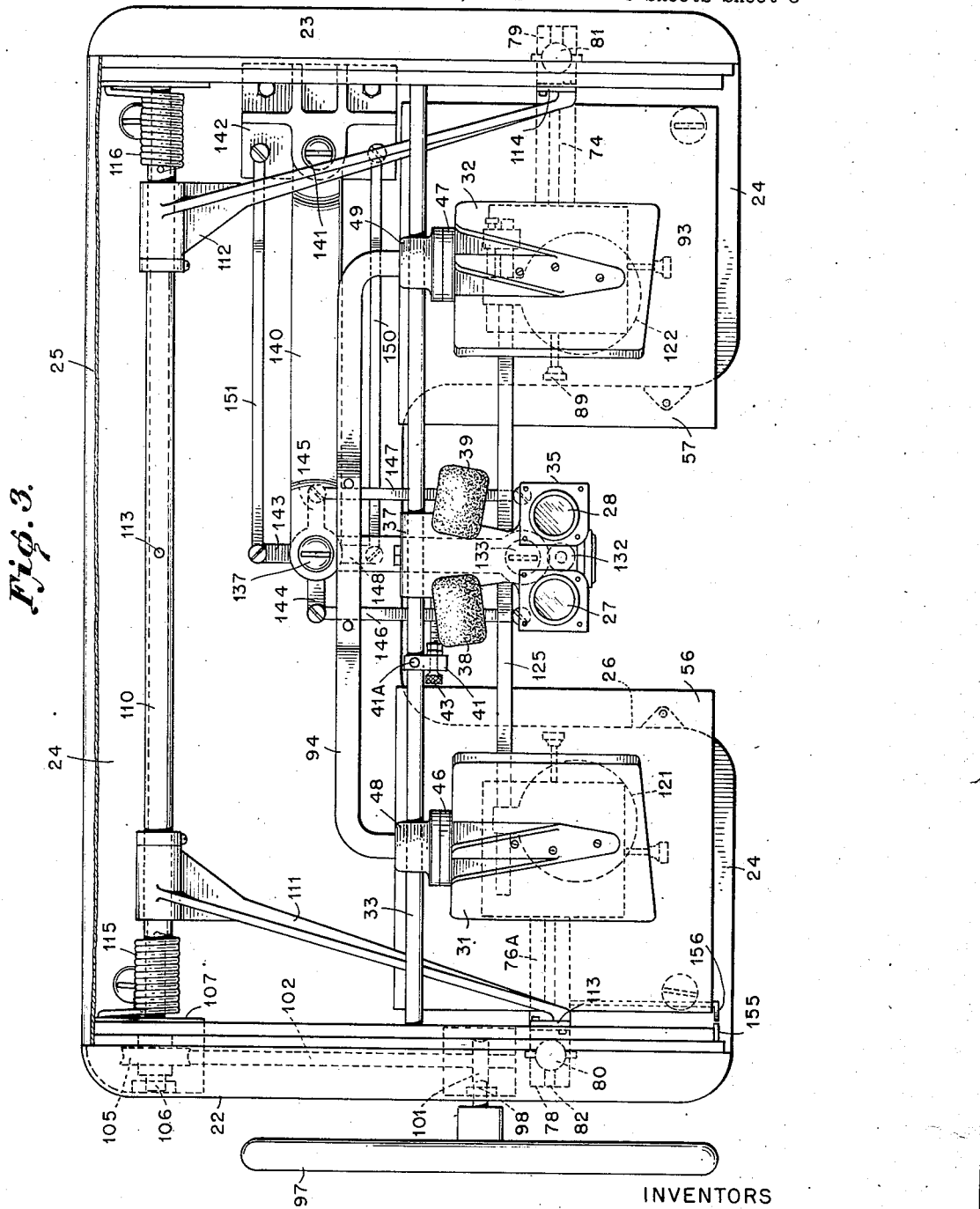
Figure 3 is a plan view.
Figure 4:
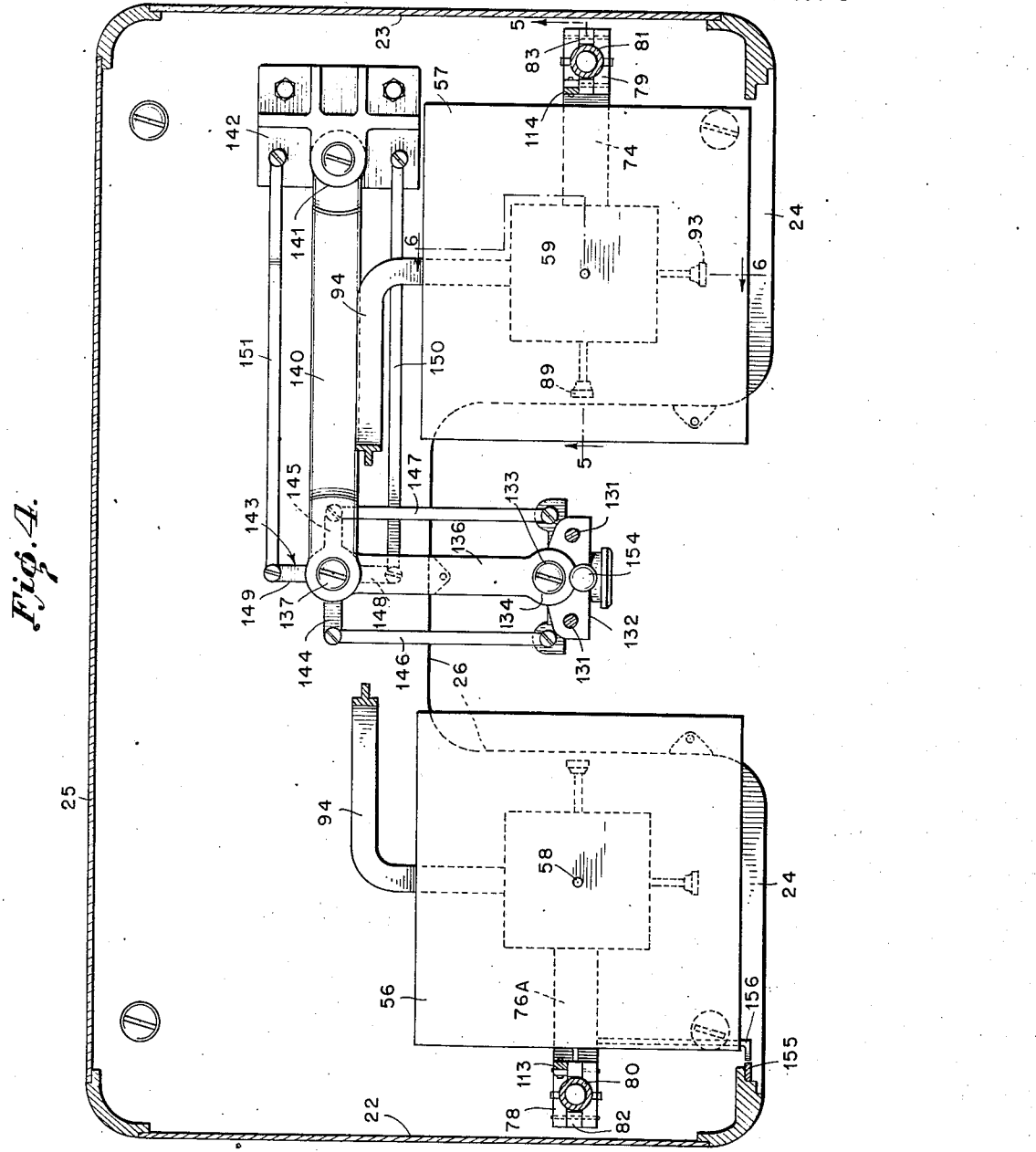
Figure 4 is a plan section along the line 4—4 of Figure 1.

Referring with more particularity to the drawings in which like numerals designate like parts, the embodiment illustrated comprises a suitable housing 21, including end walls 22 and 23, a base 24, and a rear wall 25. A removable cover (not shown) for the remaining exposed portion of the housing may be provided to completely enclose the instrument therein when not in use. A portion 26 of the base 24 is cut away to permit the tracing implement of the instrument to be lowered in contact with and to be moved over any plane surface upon which the instrument may rest.

Within the housing 21 there is mounted near the top a mirror stereoscope comprising the usual eye pieces 27 and 28 and eye piece mirrors 29 and 30 and wing mirrors 31 and 32. The mirrors 31 and 32 are mounted on a pair of parallel bars 33 and 34, which bars are horizontally fixed, one above the other, to the end walls 22 and 23 of the housing. The mirrors 29 and 30 are co-mounted with the eye pieces 27 and 28 in a frame 35 on a bracket 36 having a sleeve 37 slidable on the upper bar 33. Head rests 38 and 39 above the eye pieces 27 and 28 are adjustably secured to the bracket 36.

An abutment screw 40 is threaded through the bracket 36 to abut the lower bar 34. By adjusting the position of this screw, the frame 35 can be tipped around the bar 33 for the purpose of leveling the eye piece mirrors 29 and 30.

Adjustment of the frame 35 along the bar 33 is accomplished by means of a rider 41 on the bars 33 and 34, adjustably clamped on the bar 33 by means of a set screw 41A, which rider carries a micrometer screw 42 parallel to the bar 33. One end of the screw 42 carries a thumb grip 43, the other end being threadedly engaged with the bracket 36.

The wing mirrors 31 and 32 are mounted on brackets 46 and 47, said brackets being vertically pivoted to sleeves 48 and 49, said sleeves being slidably mounted on the bar 33. Sleeves 48 and 49 carry arms 50 and 51, which arms carry adjustable abutment screws 52 and 53 which abut the bar 34 and thereby permit a leveling adjustment of these mirrors about the bar 33.

Beneath the wing mirrors 31 and 32 there are disposed phototables 54 and 55 for mounting the stereoscopic pictures comprising platens 56 and 57, at the center of which short upright pins 58 and 59 are fixed to engage pivotally the centers of the photographic prints. Each of these platens is fixed to convex runners 60 and 61 disposed in vertical parallel planes, which are supported on corresponding concave shoulders 62 and 63 of a block 64 and held in position by abutments 65 and 66 integral with the block 64 and bearing against the inner sides of the runners 60 and 61. The inner sides of the runners are provided with notched grooves and the sides of the abutments contacting the runners have projections 65A and 66A complementary with said grooves, thereby holding the runners down against the shoulders 62 and 63.

The bottom of the block 64 is provided with convex runners 67 and 68 similar to the runners 60 and 61 which are disposed in vertical planes 90° to the runners 60 and 61. These runners 67 and 68 are similarly seated on concave shoulders 69 and 70 of a base 71, against which shoulders they are held by means of tapered abutments 72 and 73 similar to the abutments 65 and 66. The base 71 of one of the phototables 55 is fixed to the horizontal arm 74 of an angle bracket 75 and the base 76 of the other phototable 54 is fixed to the horizontal arm 76A of a similar angle bracket 77. The brackets 77 and 75 carry vertical sleeves 78 and 79 which ride on vertical posts 80 and 81 fixed adjacent the end walls 22 and 23 within the housing 21. The sleeves 78 and 79 are provided with anti-friction rollers 82 and 83 which contact and roll on posts 80 and 81. In order to lock the phototables in different positions along the posts 80 and 81, clamps 84 and 85 attached to the brackets 75 and 77 are provided.

An arced rack 86 is fixed to the bottom of each of the platens 56 and 57 parallel to the runners 60 and 61 and engages a worm 87 which is fixed to the end of a shaft 88 rotatably mounted on the block 64. The other end of said shaft projects outwardly and is provided with a knurled knob 89 to facilitate manual rotation.

Similarly, a curved rack 90 is integral with the bottom of the block 64 parallel to the runners 67 and 68 and engages a worm 91 fixed to one end of a shaft 92, said shaft being rotatably mounted on the base member 71. The other end of said shaft projects outwardly and is provided with a knurled knob 93 to facilitate manual rotation thereof. The centers of curvature of runners 60 and 61 are at a distance above the plane of the platens equal to the focal point of the stereoscopic pictures to be used on the instrument. The centers of curvature of the runners 67 and 68 are at the same distance above the platens.

The phototables 54 and 55 are held rigidly together by means of a stiff bar 94 fixed to the bases 71 and 76. Illuminating lamps 95 and 96 are mounted on the bar 94 to illuminate photographs placed on the platens 56 and 57. However, these lamps may be mounted at any other suitable place in the housing.

The phototables 54 and 55 are moved vertically along the posts 80 and 81 by a hand wheel 97 on one side of the instrument which is fixed to one end of a rotatable shaft 98 mounted through a bearing 99 in one of the end walls 22 or 23 depending on whether the machine is to be used by a right-handed operator or a left-handed operator. The other end of the shaft 98 is fixed to a spiral gear 100 which meshes with another spiral gear 101 to which there is fixed one end of a shaft 102 extending rearward within the housing 21. The gears 100 and 101 are housed in a gear box 103. The rearward end of the shaft 102 is fixed to a worm 104 which meshes with a worm gear 105 on the end of a horizontal shaft 106. The gears 104 and 105 are housed by gear box 107. The shaft 106 is rotatably mounted in bearings 108 and 109 on the end walls 22 and 23. About the shaft 106 a sleeve 110 is disposed, to the ends of which there are fixed arms 111 and 112. The shaft 106 and sleeve 110 are made co-actable by means of a pin 113 midway between the arms 111 and 112, driven through both the sleeve 110 and shaft 106. In this manner torque displacement is distributed equally to both arms 111 and 112 when the shaft 106 is rotated.

The outer ends of the arms 111 and 112 are pivoted to one of the ends of links 113 and 114, the other end of each link being pivoted to its corresponding sleeve 78 and 79. By these means rotation of hand wheel 97 in one direction causes the phototables 54 and 55 to move upwardly together, and rotation in the opposite direction of said hand wheel causes the phototables to move downwardly. The weight of the phototables and of the parts movable therewith are counterbalanced by means of coil springs 115 and 116 which are mounted for tensioning around shaft 106 adjacent the ends of sleeve 110. One of the ends of springs 115 and 116 is fixed to sleeve 110 and the other end anchored to a fixed point of the instrument.

Between the wing mirrors 31 and 32 and the phototables 54 and 55 there are disposed index marks of any suitable design, but preferably simple dots 117 and 118 inscribed, etched, or otherwise provided on glass discs 119 and 120, or other suitable transparent material. The discs 119 and 120 are mounted in frames 121 and 122, which frames are fixed to brackets 123 and 124 slidable on the ends of a horizontal bar 125 which is in a vertical plane parallel to the line of centers of the platens 56 and 57. Set screws 126 and 127 are provided through the brackets 123 and 124 for clamping them in different positions along the bar 125. On one end of the bar 125 a collar 128 is adjustably clamped, which carries a micrometer screw 129 having on one end a knurled head 130 for manually rotating it, the other end being threadedly engaged with the adjacent index mark bracket. The bar 125 is supported parallel to phototables 54 and 55 on the top of stanchions 131. These stanchions are carried on a support 132 which is movable over the cut-out portion 26 of the base of the instrument. The support 132 is pivoted to a vertical pin 133 fixed to the fork branches 134 and 135 of the bifurcated end of an arm 136, said branches straddling the support 132, substantially as shown. The other end of the arm 136 is pivoted to a vertical pin 137 which pin is fixed to fork branches 138 and 139 of the bifurcated end of another arm 140. The other end of the arm 140 is pivoted to a pin 141 vertically fixed to a bracket 142 on the base of the instrument.

The pin 137 extends through the lower branch 139 of the arm 140 and is fixed to the center of a horizontal cross arm or X-shaped member 143, one pair of opposite arms 144 and 145 of said member being in a vertical plane parallel to the bar 125. The outer ends of the arms 144 and 145 are pin-connected to the ends of a pair of links 146 and 147 of equal length, the point of connection on said arms 144 and 145 being equidistant from the axis of pin 137. The other end of the links 146 and 147 is pin-connected to the support 132 on opposite sides of and equidistant from the pin 133 to form a parallelogram linkage.

The other arms 148 and 149 of the member 143 also have their outer ends pin-connected to the ends of a pair of links 150 and 151 of equal length, the points of connection on said arms 148 and 149 being equidistant from the axis of the pin 137. The other ends of the links 150 and 151 are pin-connected to the bracket 142 on opposite sides of and equidistant from the pin 141 to form another parallelogram linkage. By these means the bar 125 and index marks 117 and 118 are constrained to move in a horizontal plane parallel to the line of centers of the platens 56 and 57.

A pencil, pen, stylus, or other tracing implement 152 is attached to the bottom of a post 153 which post is slidably and rotatably mounted through the bracket 132 and carries a weight 154 at the top to press the tracing implement against the working plane. The operator moves the tracing implement by means of a handle 154A horizontally hinged to the post 153.

A vertical scale 155 is mounted adjacent to one of the posts 80 and 81, say the post 80, and a pointer 156 movable over the scale 155 is fixed to the bracket 77. In view of the fact that the viewing distance of the instrument varies in operation and thereby causes the model to become elongated and depressed, the graduations of the scale 155 are not uniform but represent the relation between intervals of ground elevation and intervals of movement of the phototables corresponding to the same ground intervals. These graduations can be determined either empirically or by mathematical calculation.

The entire instrument is supported on casters 157 to permit easy movement over a mapping surface 158.

The instrument is operated as follows: A pair of vertical photograph prints having a stereoscopic overlap is mounted on the platens 56 and 57 with the center of each print over the center of each platen. The prints are held in this position by forcing the pins 58 and 59 through the center of the print. The prints are then oriented about the pins until they are in stereoscopic correspondence and then clamped to platens by clips, Scotch tape, or any other suitable means.

The stereoscopic model is then horizontalized in the usual manner by the use of basic reference points obtained from ground control, the adjustments being made by tipping and tilting the platens with the knobs 89 and 93, the while maintaining stereoscopic correspondence. In using the instrument for planimetry, it is not essential to horizontalize the model, although it is preferred. The instrument is then adjusted for a selected scale by spreading the index marks to a position where the movement of their fused images as seen through the stereoscope, commonly referred to as the "floating mark", between two given points on the model is equal to the movement of the tracing implement 152 between the same two points plotted to the desired scale on the mapping surface 158.

In making planimetric maps, the index marks are moved to a position where the "floating mark" appears to contact the surface of the model at a point on the extreme end of a planimetric line, such as a drainage line, and the tracing implement is put in contact with a mapping surface over which the instrument is placed. The tracing implement is then moved so that the "floating mark" follows the selected planimetric line of the model, the while continually changing the elevation of the phototables by turning the hand wheel 97 to cause the "floating mark" to appear to contact the surface of the model at every point along the planimetric line traversed. When this traverse is completed, the tracing implement is elevated and another planimetric line is selected for which the same procedure is followed. This is repeated for every desired planimetric line of the stereoscopic model to complete the map.

To use the instrument for making contour maps, the same preliminary adjustments are made as indicated above, including horizontalization of the model. The phototables are then set at a height so that the "floating mark" appears to contact the model at a point on a selected contour elevation thereof and the tracing implement is placed in contact with the mapping surface. The tracing implement is then moved so that the "floating mark" at the height setting of the phototables constantly contacts the model at each change of position. In this manner the "floating mark" follows a line of constant elevation which is traced on the map table by the tracing implement. When one contour line has been mapped, the height setting of the phototables is changed by turning the hand wheel 97 until the pointer 156 is opposite the point on the scale 155 indicating the next contour elevation desired and the procedure is repeated. This is done for each contour until the map is completed.

Having thus described our invention, we claim:

1. A mapping instrument comprising a portable housing movable on a mapping surface, said housing containing a pair of tables for mounting stereoscopic pictures, means for moving said tables vertically, a stereoscope over said tables for stereoscopically viewing pictures on said tables, index marks supported for horizontal movement between said tables and said stereoscope in the field of stereoscopic vision, means constraining the movement of said marks in a horizontal plane parallel to the line of centers of said tables, and a tracing implement co-movable with said index marks for tracing lines on said mapping surface in accordance with the movements of said index marks.

2. A mapping instrument comprising a portable housing movable on a mapping surface, said housing containing a pair of tables for mounting stereoscopic pictures, means for moving said tables vertically, means for independently tipping and tilting said tables about a point thereabove, a stereoscope over said tables for stereoscopically viewing pictures on said tables, index marks supported for horizontal movement between said tables and said stereoscope in the field of stereoscopic vision, means constraining the movement of said marks in a horizontal plane parallel to the line of centers of said tables, and a tracing implement co-movable with said index marks for tracing lines on said mapping surface in accordance with the movements of said index marks.

3. A mapping instrument comprising a portable housing movable on a mapping surface, said housing containing a pair of tables for mounting stereoscopic pictures, means for moving said tables vertically, a pointer vertically co-movable with said tables and a vertical scale adjacent said pointer designating intervals of ground elevation corresponding to the vertical movement of said tables, a stereoscope over said tables for stereoscopically viewing pictures on said tables, index marks supported for horizontal movement between said tables and said stereoscope in the field of stereoscopic vision, means constraining the movement of said marks in a horizontal plane parallel to the line of centers of said tables, and a tracing implement co-movable with said index marks for tracing lines on said mapping surface in accordance with the movements of said index marks.

4. A mapping instrument comprising a portable housing supportable on a mapping surface, said housing containing a pair of tables for mounting stereoscopic pictures, means for co-moving said tables vertically, a stereoscope for viewing pictures on said tables, a pair of index marks above said table in the field of view of said stereoscope, said marks being spaced in the direction of the line of centers of said tables and at a fixed distance below said stereoscope, means for adjusting the spaced relation of said marks, means supporting said marks for horizontal co-movement and constraining said movement so that every position of said marks is parallel to every other position, and a tracing implement co-movable with said index marks for tracing lines on said surface in accordance with the movement of said marks.

5. In a mapping instrument of the character described having in a portable housing a pair of tables for mounting stereoscopic pictures, vertical center pins for engaging said pictures as a pivot, means for independently tipping and tilting said tables, means for co-moving said tables vertically, a pair of index marks above said tables, a stereoscope for viewing said pictures and said marks stereoscopically at the same time, supporting means for said marks and a linkage for constraining the movement of said marks in a horizontal plane so that every position of said marks is parallel to every other position, and a tracing implement co-movable with said marks for tracing lines on a surface in accordance with the movement of said marks.

6. In a mapping device of the character described having in a portable housing a pair of tables for mounting stereoscopic pictures, brackets supporting said tables, vertical posts slidably engaging said brackets, means for holding said brackets in substantially the same horizontal plane, a horizontal shaft rotatably mounted in the housing, a sleeve about said shaft, means connecting the center of said shaft with the center of said sleeve, arms secured to the ends of said sleeve projecting toward said brackets, links connecting the outer ends of said arms with said brackets, springs mounted for tensioning about said shaft between the ends of said sleeve and said housing to counterbalance the weight of said tables and parts movable therewith, and means for rotating said shaft to raise and lower said tables.

7. In a mapping device having a table for mounting a stereoscopic picture, said table comprising a platen for mounting the picture, a vertical pin on said platen for pivotally engaging the picture, curved runners secured to said platen, said runners being in parallel vertical planes, a block having shoulders complementary to said runner, means for holding said runner in slidable engagement with said shoulders, similar curved runners secured to said block in parallel vertical planes perpendicular to the planes of said first-mentioned runners, a base support having shoulders complementary to said block runners, means for holding said block runners in slidable relation with said base support shoulders, and means for controllably actuating all of said runners on their corresponding shoulders so as to tip and tilt said platen.

8. In a plotting device having tables for mounting stereoscopic pictures and a stereoscope for viewing pictures on said tables, index marks co-movable in a horizontal plane between the stereoscope and the tables, a tracing implement movable with said index marks, means for raising and lowering said tables, and means for constraining the movements of said index marks so that every position of said marks is parallel to every other position thereof.

9. In a plotting device having tables for mounting stereoscopic pictures and a stereoscope for viewing pictures on said tables, index marks co-movable in a horizontal plane between the stereoscope and the tables, a tracing implement movable with said index marks, means for raising and lowering said tables, lamps co-movable with said tables for illuminating pictures mounted thereon, and means for constraining the movements of said index marks so that every position of said marks is parallel to every other position thereof.

10. In a stereoscopic plotting instrument of the character described, said instrument being contained in a portable housing, said housing being mounted on casters so that the entire instrument can be supported on a mapping surface and moved thereover, said instrument having a tracing instrument adapted to contact the mapping surface upon which the instrument is supported.

11. In combination with a mapping surface, a housing movable bodily over said surface, tables within said housing for mounting stereoscopic pictures, a stereoscope for viewing pictures on said tables, a support movable over said mapping surface relative to said housing, means constraining the movements of said support so that every position thereof is parallel to every other position, means carried by said support for scanning the stereoscopic model viewed through the stereoscope, and a tracing implement movable with said support for tracing the movements of said support on said mapping surface.

12. In combination with a mapping surface, a housing movable bodily over said surface, tables within said housing for mounting stereoscopic pictures, a stereoscope for viewing pictures on said tables, means for adjusting said tables to compensate for photographic tilt and tip, a support movable over said mapping surface relative to said housing, means constraining the movements of said support so that every position thereof is parallel to every other position, means carried by said support for scanning the stereoscopic model viewed through the stereoscope, and a tracing implement movable with said support for tracing the movements of said support on said mapping surface.

13. In combination with a mapping surface, a housing movable bodily over said surface, tables within said housing for mounting stereoscopic pictures, a stereoscope for viewing pictures on said tables, said tables being mounted for vertical co-movement, means for moving said tables vertically, releasable means for securing said tables at different heights within the housing, a support movable over said mapping surface relative to said housing, means constraining the movements of said support so that every position thereof is parallel to every other position, means carried by said support for scanning the stereoscopic model viewed through the stereoscope, and a tracing implement movable with said support for tracing the movements of said support on said mapping surface.

JASPER E. KING.
JOHN W. ELLIOTT.
PHILIP B. KAIL.